United States Patent [19]
Meinert

[11] 3,967,742
[45] July 6, 1976

[54] HAY STACK MOVER
[75] Inventor: Harry Mathais Meinert, Des Moines, Iowa
[73] Assignee: Deere & Company, Moline, Ill.
[22] Filed: Jan. 31, 1975
[21] Appl. No.: 545,825

[52] U.S. Cl. .............................. 214/766; 214/144
[51] Int. Cl.² ........................................... B66F 9/12
[58] Field of Search ........... 214/501, 505, 506, 510, 214/514, 131, 766, 768, 144, 80, 654, 352; 294/105, 108, 123, 67 AB; 280/43.23

[56] References Cited
UNITED STATES PATENTS

| | | | |
|---|---|---|---|
| 2,353,949 | 7/1944 | Warren | 214/131 |
| 3,124,263 | 3/1964 | Eaves | 214/654 |
| 3,826,393 | 7/1974 | Carroll | 280/43.23 X |
| 3,878,959 | 4/1975 | Holdeman et al. | 214/506 |

FOREIGN PATENTS OR APPLICATIONS

| | | | |
|---|---|---|---|
| 231,352 | 5/1963 | Austria | 294/108 |
| 179,788 | 6/1962 | Sweden | 214/144 |

Primary Examiner—Albert J. Makay

[57] ABSTRACT

Hay stacks and bales are loaded, transported and unloaded by a single man. Pivotal lifting tines carried by a mast which attaches to a tractor three-point hitch are maneuvered under a stack or bale. Lift assist wheels coupled with the mast raise the loaded tines to transport the load. A clamp means secures the stack or bale during transport and the tapered tines permit ease of tine withdrawal from unloaded stacks and bales.

1 Claim, 4 Drawing Figures

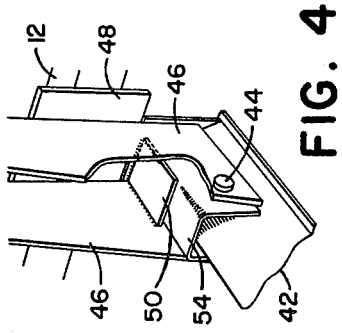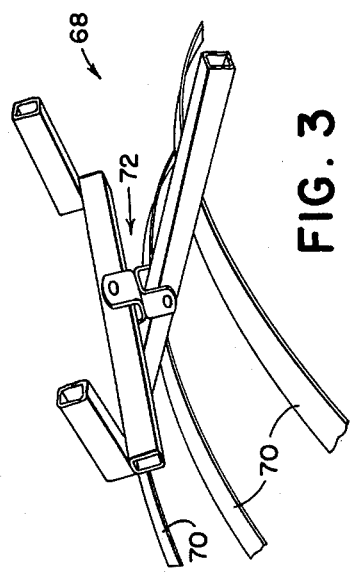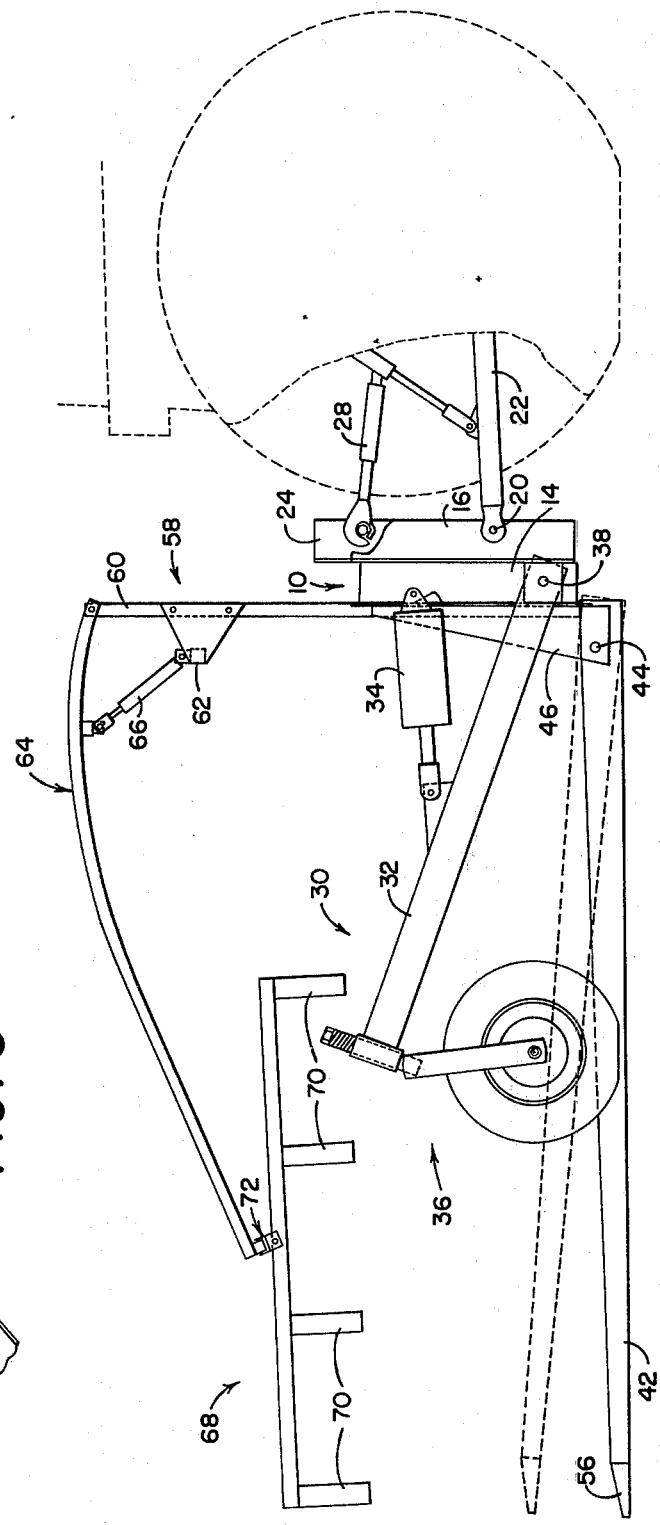

HAY STACK MOVER

BACKGROUND OF THE INVENTION

Implements operated by a single man and used in picking up and tightly forming harvested crop material have recently become available. See, for example, U.S. Pat. No. 3,813,861 granted to W. R. Wood on 4 June 1974. With the introduction of such implements, complementary handling equipment capable of being operated by a single man have become necessary. Such single man handling implements must be capable of loading, transporting, and unloding a formed stack or bale. Additionally, the formed crop material must be carefully handled so that it is not broken or caused to be deformed whereby it cannot shed rain and thereby preserve itself against the elements.

SUMMARY OF THE INVENTION

The invention includes an upstanding mast having means for securing it to a three-point hitch, lift assist wheels on each end of the mast, triangularly-shaped and tapered lifting tines pivotally secured to the mast lower member and extending rearwardly therefrom, and a swingable boom attached to the mast, extending rearwardly therefrom, and having a rockable clamp thereon to secure the stack or bale during transport.

This invention permits a single person to load, transport, and unload a stack or bale of tightly formed crop material and not reduce that stack's or bale's ability to preserve itself against the elements.

BRIEF DESCRIPTION OF THE DRAWINGS

FIG. 2 is a side view of the invention illustrating the pivotable feature of the lifting tines.

FIG. 3 is a detailed view of the clamp-boom connection.

FIG. 4 is an enlarged perspective view with portions broken away of the stop plate which limits the tine pivotal ability.

DESCRIPTION OF THE PREFERRED EMBODIMENT

Figure 1:
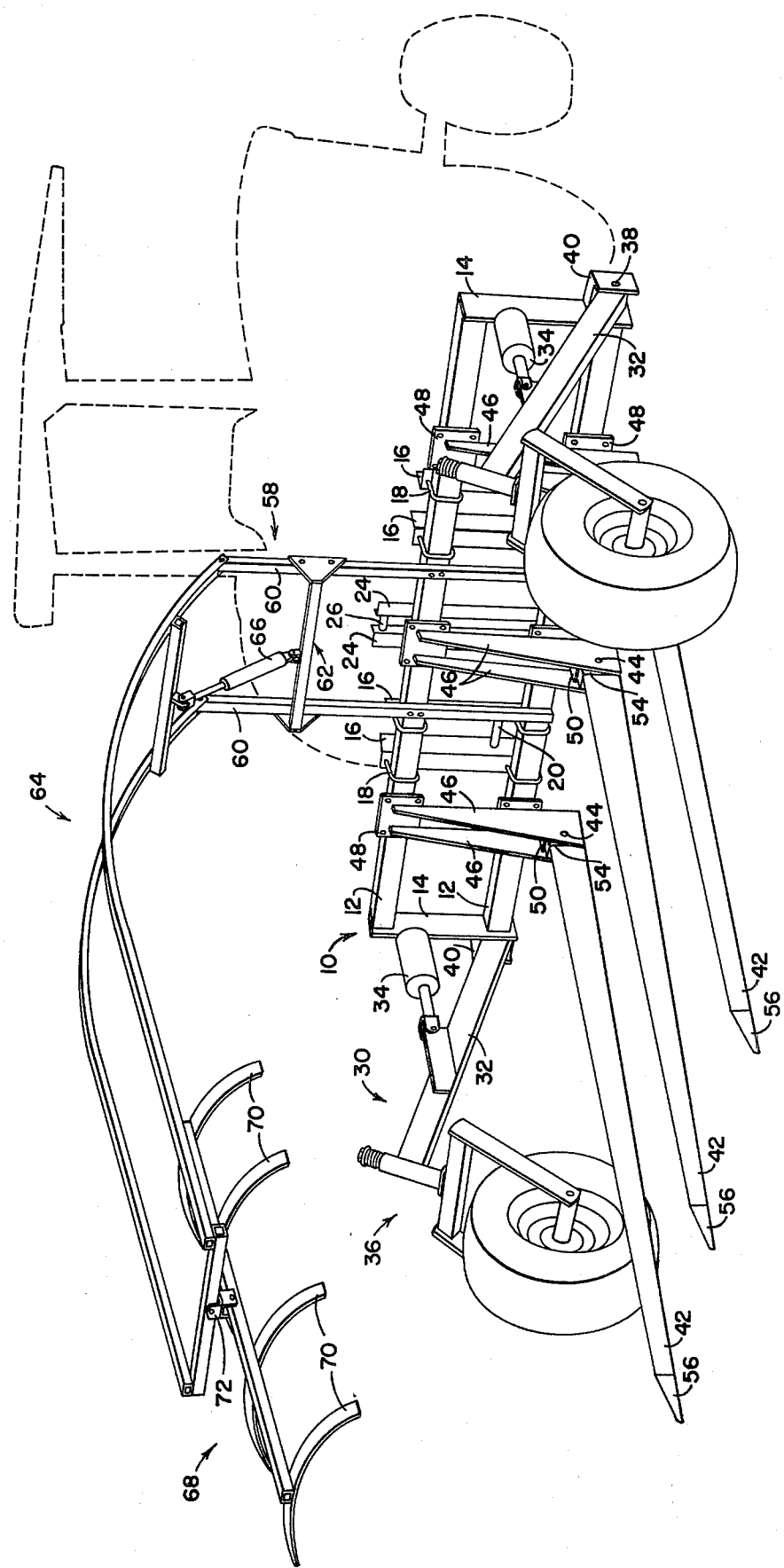
FIG. 1 is a right, rear perspective view of the invention.

This improved stack and bale mover, as illustrated in FIG. 1, is mounted behind a tractor and attached to the tractor three-point hitch.

The implement includes an upstanding mast 10 comprised of two transversely positioned, coplanar and parallel memebers 12 secured together at their respective end portions by end braces 14. Two pair of upstanding hitch support members 16 are secured by U-bolts 18 to the forward side of the mast. Between each pair of supports 16 is secured a hitch mounting pin 20 whereupon the lower links 22 of the tractor three-point hitch is secured. A third pair of upstanding hitch support members 24 is secured midway between the other hitch supports 16, and support a pin 26 upon which the upper link 28 of the three-point hitch is secured.

Lift assist assemblies 30, essentially identical in structure, are rockably secured to each mast end brace 14. Each lift assist assembly 30 includes a lift arm 32, an extensible and retractable power means 34 and a caster wheel assembly 36. Each lift arm 32 is rockably carried on a pin 38 mounted between the lower portion of its respective end brace 14 and a respective L-shaped mounting member 40. Pivotally secured to and extending between each end brace 14 upper portion and its respective lift arm 32 middle portion is the hydraulic cylinder 34. At the rearward end of the lift arm 32 is rotatably secured a typical caster wheel assembly 36.

Lifting tines 42 are pivotally secured by tine pins 44 between upright tine supports 46. The tine supports are in turn fastened to plates 48 mounted on the rear surface of the mast horizontal members 12. As best observed in FIG. 4, a stop plate 50 is secured between the upright tine supports 46 directly above the forward portion of each tine 42 and forward of and over the tine pivotal pin 44. This plate is located relative to the tine pivotal pin 44 such that a U-shaped tine shoe 54 fixed to the forward end of the respective tine 42 contacts the stop plate 50 when the tine 42 is raised to an angle of approximately 45° above horizontal. When the tine shoe 54 contacts the plate 50, further upward rotation of the tine is prevented. The tines 42 are hollow, triangularly-shaped and tapered from their front portions to their rearward portions, with each tine 42 having a pointed tip 56 to facilitate easier entry under stacks and bales.

Attached to the rearward portion of the mast 10 is a boom support 58. The boom support 58 includes two tubular members 60 secured to the rearward side of the mast 10 and a cross brace 62 therebetween. Extending rearwardly from the boom support 58 and pivotally attached to the support 58 for swinging movement about a horizontally transverse axis is a boom 64. A hydraulic cylinder 66 extends between the boom 64 and the boom support cross brace 62. The cylinder 66 operates to swingably rotate the boom 64. To the rearward portion of the boom 64 and supported above the tines 42, is rockably attached a load securing or clamping means 68 for securing the load between the boom 64 and the tines 42. The clamping means 68 includes a clamp having arch-shaped fingers 70 positioned above and transverse to the tines 42. The clamp 68 is rockably secured at 72 to the boom 64 and is movable about both a transverse and a lateral axis.

To load a stack or bale, the operator simply backs the implement up to the load, lowers the tines 42 to the ground and slidably maneuvers the tines 42 under the load. A stack or bale can be loaded with the lift assist assembly 30 either raised or lowered. The wheels should be raised when the stack or bale is on inclined ground since the tines 42 must slidably follow the ground contour and avoid digging into the ground or stack. As illustrated by the dotted lines in FIG. 2, each tine is capable of independently pivoting about its pivotal pin 44 to slide over uneven ground or contours as they are encountered during the loading or unloading process. When the stack or bale is on level ground or elevated above the ground, the lift assist assembly 30 can be used to position the tines 42 to the proper height and to assure support for the loaded tines 42. Since the pivotable tines will not dig into the ground as readily as fixed tines, less tine and implement damage are incurred during loading operations.

Often a stack or bale must be transported over rough terrain or for long distances. During such transport the stack or bale is often jarred and will lose its compacted condition. To minimize this problem, the implement is provided with the clamp 68 and the lift assist wheels. The wheels serve to stabilize the tractor-implement combination and provide support for the tine platform to thereby cushion it against shocks. The wheels can also be adjusted to assure that the load rides high enough off the ground to avoid contacting bumps during transport To secure the stack or bale during transport, the clamp 68 is automatically lowered at the end of the lift cycle and the load stabilized between it and the tines. The hydraulic cylinder is sized to give optimum hold down force on any height stack or bale at full system pressure. The arch-shaped clamp allows the implement to be used for stable transport of both stacks and bales. The coupling 72 between the clamp 68 and the boom 64 permits the clamp 68 to pitch or roll to thereby grasp whatever size or shape load being transported.

To unload a stack or bale requires that the lift assist wheels be raised and the tines lowered until the load is resting on the ground. The clamps automatically raises and the operator pulls the tines out from under the load. Because the tines are triangular and because they are tapered, they will easily slip out of the load without sticking or binding as is often the situation with flat tines.

I claim:

1. A load lifting device comprising: an upstanding mast having means thereon for detachably securing said mast to a tractor three-point hitch; a pair of independent lift arms rockably secured to the mast end portions and projecting rearwardly therefrom; lift wheels carried on the arms adjacent their rear ends; an extensible and retractable power means between the mast and each arm for adjusting the latter; a plurality of transversely spaced apart tine members each member pivotally secured at its forward end for vertical movement with respect to said mast and extending rearwardly therefrom; means on the mast for limiting each tine's vertical movement; an elongated boom pivotally carried by said mast, extending in vertically spaced and overlying relation to the tines; power means coupled with said boom for swinging the boom; and a downwardly facing clamping structure articulately mounted on the boom for securing a load on the tines.

* * * * *